(12) United States Patent
Oldani

(10) Patent No.: US 8,954,180 B2
(45) Date of Patent: Feb. 10, 2015

(54) MANUFACTURING PROCESS AND APPARATUS HAVING AN INTERCHANGEABLE MACHINE TOOL HEAD WITH INTEGRATED CONTROL

(75) Inventor: Tino Oldani, Rockford, IL (US)

(73) Assignee: Ingersoll Machine Tools, Inc., Rockford, IL (US)

( * ) Notice: Subject to any disclaimer, the term of this patent is extended or adjusted under 35 U.S.C. 154(b) by 533 days.

(21) Appl. No.: 13/198,788

(22) Filed: Aug. 5, 2011

(65) Prior Publication Data

US 2012/0035754 A1  Feb. 9, 2012

Related U.S. Application Data

(60) Provisional application No. 61/371,236, filed on Aug. 6, 2010, provisional application No. 61/406,192, filed on Oct. 25, 2010.

(51) Int. Cl.
| | | |
|---|---|---|
| B23P 19/00 | (2006.01) | |
| G05B 19/418 | (2006.01) | |
| G05B 19/414 | (2006.01) | |
| B23Q 3/155 | (2006.01) | |

(52) U.S. Cl.
CPC ........ G05B 19/4141 (2013.01); B23Q 3/15506 (2013.01)
USPC ............................................. 700/96; 700/173

(58) Field of Classification Search
CPC ....................... G06G 7/122; G05B 2219/25045
USPC ....................................... 700/13, 123, 179, 96
See application file for complete search history.

(56) References Cited

U.S. PATENT DOCUMENTS

| | | | |
|---|---|---|---|
| 4,068,536 A | | 1/1978 | Stackhouse |
| 4,520,530 A | | 6/1985 | Pinto |
| 4,557,790 A | | 12/1985 | Wisbey |
| 4,696,707 A | * | 9/1987 | Lewis et al. ...................... 156/64 |
| 4,709,465 A | * | 12/1987 | Lewis et al. ...................... 483/7 |
| 4,907,754 A | | 3/1990 | Vaniglia |
| 4,909,880 A | | 3/1990 | Kittelson et al. |
| 4,943,338 A | | 7/1990 | Wisbey |
| 5,022,952 A | | 6/1991 | Vaniglia |

(Continued)

FOREIGN PATENT DOCUMENTS

| | | |
|---|---|---|
| EP | 0198744 A1 | 10/1986 |
| EP | 1 342 555 A1 | 9/2003 |

(Continued)

OTHER PUBLICATIONS

U.S. Appl. No. 12/905,337, filed Oct. 15, 2010.

(Continued)

*Primary Examiner* — Mohammad Ali
*Assistant Examiner* — Emilio J Saavedra
(74) *Attorney, Agent, or Firm* — Reinhart Boerner Van Deuren P.C.

(57) ABSTRACT

A modular manufacturing system and methods of using are provided. The modular manufacturing system includes a plurality of manufacturing heads that perform different manufacturing processes. These heads may include multi-axial machining heads, fiber placement heads including fiber tow and fiber tape lay-up heads. The heads are fixably attachable to a single positioning system that can manipulate the various heads along a plurality of different degrees of freedom relative to a tool or material blank.

7 Claims, 7 Drawing Sheets

(56) References Cited

U.S. PATENT DOCUMENTS

| | | | |
|---|---|---|---|
| 5,046,233 A * | 9/1991 | Shoda | 483/32 |
| 5,223,072 A | 6/1993 | Brockman et al. | |
| 5,239,457 A | 8/1993 | Steidle et al. | |
| 5,584,621 A | 12/1996 | Bertsche et al. | |
| 5,651,850 A | 7/1997 | Turner et al. | |
| 5,698,066 A | 12/1997 | Johnson et al. | |
| 5,761,965 A | 6/1998 | Dahlquist | |
| 6,026,883 A | 2/2000 | Hegerhorst et al. | |
| 6,096,164 A | 8/2000 | Benson et al. | |
| 6,544,367 B1 | 4/2003 | Fujimoto et al. | |
| 6,566,836 B2 * | 5/2003 | Matsubara et al. | 318/600 |
| 6,874,437 B2 * | 4/2005 | Kim | 112/102.5 |
| 7,353,853 B2 | 4/2008 | Borgmann et al. | |
| 7,467,782 B2 | 12/2008 | Harvey et al. | |
| 7,472,736 B2 * | 1/2009 | Kisch et al. | 156/433 |
| 2005/0236735 A1 | 10/2005 | Oldani | |
| 2006/0090856 A1 | 5/2006 | Nelson et al. | |
| 2007/0029030 A1 | 2/2007 | McCowin | |
| 2007/0044919 A1 | 3/2007 | Hoffmann | |
| 2007/0084960 A1 | 4/2007 | Heaney et al. | |
| 2008/0295954 A1 | 12/2008 | Kisch et al. | |
| 2009/0078361 A1 | 3/2009 | Kisch et al. | |
| 2009/0095410 A1 | 4/2009 | Oldani | |
| 2009/0204253 A1 | 8/2009 | Bandini et al. | |
| 2010/0024964 A1 | 2/2010 | Ingram, Jr. et al. | |
| 2010/0200168 A1 | 8/2010 | Oldani et al. | |

FOREIGN PATENT DOCUMENTS

| | | |
|---|---|---|
| EP | 1 719 610 A1 | 11/2006 |
| EP | 1 757 433 A1 | 2/2007 |
| WO | WO 2004/101413 A2 | 11/2004 |
| WO | WO 2005/105415 A2 | 11/2005 |
| WO | WO 2006/088851 A1 | 8/2006 |
| WO | WO 2010/049424 A1 | 5/2010 |

OTHER PUBLICATIONS

Three-Axes Wrist Drive; Publication; Dec. 1, 1984; pp. 4103-4104; IBM Technical Disclosure Bulletin; US.

* cited by examiner

MANUFACTURING PROCESS AND APPARATUS HAVING AN INTERCHANGEABLE MACHINE TOOL HEAD WITH INTEGRATED CONTROL

CROSS-REFERENCE TO RELATED PATENT APPLICATIONS

This patent application claims the benefit of U.S. Provisional Patent Application No. 61/371,236, filed Aug. 6, 2010, and U.S. Provisional Patent Application No. 61/406,192, filed Oct. 25, 2010, the entire teachings and disclosures of which are incorporated herein by reference thereto.

FIELD OF THE INVENTION

This invention generally relates to machine apparatuses and particularly devices for the purposes of multi-axial metal removal, such as cutting machine tools, and composite fiber tape manufacturing or composite fiber placement manufacturing.

BACKGROUND OF THE INVENTION

The practice of manufacturing in aircraft or aerospace fields has become simultaneously complex and diverse requiring multiple disciplines incorporating either metal removal in the form of cutting the desired piece from a larger general shape of the desired metal, or the application of composite fiber in broad bands commonly referred to as "tape" against a stationary tool, mold or rotating mandrel (referred to generically herein as a tool), or the application of smaller composite fiber "tows" against a tool.

Each of these methods of manufacturing has been dependent upon the incorporation and utilization of Computer Aided Design and Manufacturing ("CAD/CAM") software programs which identify and premise all manufacturing processes through a series of algorithms executed from a main computer through the appropriate machine tool software. These algorithms include certain formula known specifically to the machine tool in regards to positions, pressure application against the mold, tool, rate of speed of movement across a predetermined pathway, rate of speed of rotation for the purposes of cutting or removing metal from a pre-designated area, ranges of drill or bore depth, and a myriad of other movements or functions necessary to complete the desired finished product.

The practice in the respective industrial applications has been the development of custom made machine systems singularly dedicated to the identified manufacturing process (i.e. machines specifically for multi-axial metal removal, or machines specifically for composite tape application, or machines specifically for composite fiber tow application), without opportunity for diversified utilization in other applications. Such specialization has limited manufacturers in their ability to secure business by reason of the considerable financial commitment necessary to acquire an efficient, contemporary, comprehensive manufacturing machine and its attendant software. This is due to redundant costs for redundant portions of the various systems that are generally universal to all processes.

As a result of this specialization, many manufacturers having limited financial resources have been unable to expand their enterprise in other fields or have been limited in either capacity or competitive ability, to engage in other types of manufacturing as related to the aircraft or aerospace industries.

What is needed therefore, is a manufacturing system that provides a traditional base positioning system, such as a gantry having a ram in either a vertical or horizontal presentation in relation to the tool that also provides a means by which the system may accommodate either a multi-axial metal removal machine tool head, a composite tape lay-up head or a composite fiber tow head for application and compaction against the fixed tool.

The invention provides such a multiple application machine tool head system and apparatus. These and other advantages of the invention, as well as additional inventive features, will be apparent from the description of the invention provided herein.

BRIEF SUMMARY OF THE INVENTION

In one aspect, this invention provides a plurality of manufacturing heads having different operating characteristics (e.g. a machine tool head for multi-axial metal removal, a composite tape lay-up head or a composite fiber tow head), attachable to a positioning system. The positioning system may provide for a plurality of degrees of freedom for moving the particular manufacturing head that is being utilized. Typically, at least three degrees of freedom are provided, but more degrees of freedom may be provided. Further, the degrees of freedom may be linear along a straight axis or rotational about a rotational axis (also referred to as a polar axis or polar degree of freedom).

In one embodiment, the position system includes a gantry system that provides three degrees of freedom. The gantry system includes a horizontal or vertical ram for movement along at least one of the degrees of freedom. The ram attaches to the desired manufacturing head. The positioning system being controlled to move the head and having the capacity to execute any number of programmed movements in concert with a CAD/CAM program for a CNC product manufacturing process. Those movements being necessary to facilitate the functioning of the manufacturing head relative to the tool.

Typically, a machine tool head for metal material removal, can include at least one head. The ram can provide movement in response to the CAD/CAM machine code for CNC product manufacturing along at least two polar axes in relation to both the gantry and the machine tool piece.

A releasable coupling is provided in the system for removably attaching the individual manufacturing heads to the positioning system. One portion of the coupling is provided by the positioning system. Each of the various manufacturing heads includes a mating or cooperating portion of the coupling.

As such, in some embodiments, a manufacturing system allows for efficient interchange of different types of manufacturing heads in the form of either the multi-axial metal removal head, composite tape lay-up head or composite fiber tow head, by means of a distinctive coupling device integrated into the machine tool, composite tape or composite fiber head(s).

In one embodiment, a fully interchangeable manufacturing system for the purposes of either multi-axial metal removal, composite tape lay-up or composite fiber application and compaction, against either a fixed or stationary tool or mold, or a rotating or moveable mandrel is provided. The interchangeable head(s) being manipulated by the positioning system having a base structure that may or may not be considered part of a gantry that presents the machine tool head in relation to the tool, mold or mandrel, from either a vertical or horizontal ram assembly attached to the base structure or gantry.

In another aspect, the invention provides manufacturing system with a plurality of manufacturing heads, each of which are connectable to a positioning system. According to this aspect, each one of the plurality of manufacturing heads advantageously incorporates a head controller. The positioning system also has a positioning system controller. The head controller of each one of the plurality of manufacturing heads can receive inputs generated manually or from the CAD/CAM software to govern the operation of a particular machining head. The head controller is also operable to send head-specific position commands to the positioning system controller to ultimately effectuate the movement and operation of the machining head.

In one embodiment, a manufacturing system according to this aspect includes a gantry apparatus having functional elements enabling multiple movement pathways of the gantry, comprising at least three linear axes by means of either two horizontal and one vertical axes of movement, or two vertical and one horizontal axes. A moving ram is positioned on one of the three axes of the gantry movement system. The manufacturing system also includes an internal position controller bearing a computer numeric control software oriented processor for determining the range, frequency and depth of movement of the ram device, as directed by a second corresponding internal position controller having a dedicated computer numeric controlled software program as designed for a manufacturing head.

In another embodiment according to this aspect, a manufacturing system is provided. The manufacturing system includes a positioning system. A positioning system controller operably communicates with the positioning system to control the movement of the positioning system. The manufacturing system also includes a plurality of manufacturing heads having different characteristics. Each one of the plurality of manufacturing heads includes and operably communicates with a head controller. The head controller is operable to govern the operation of the manufacturing head communicating with the head controller. The head controller is operable to send position commands to the positioning system controller.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
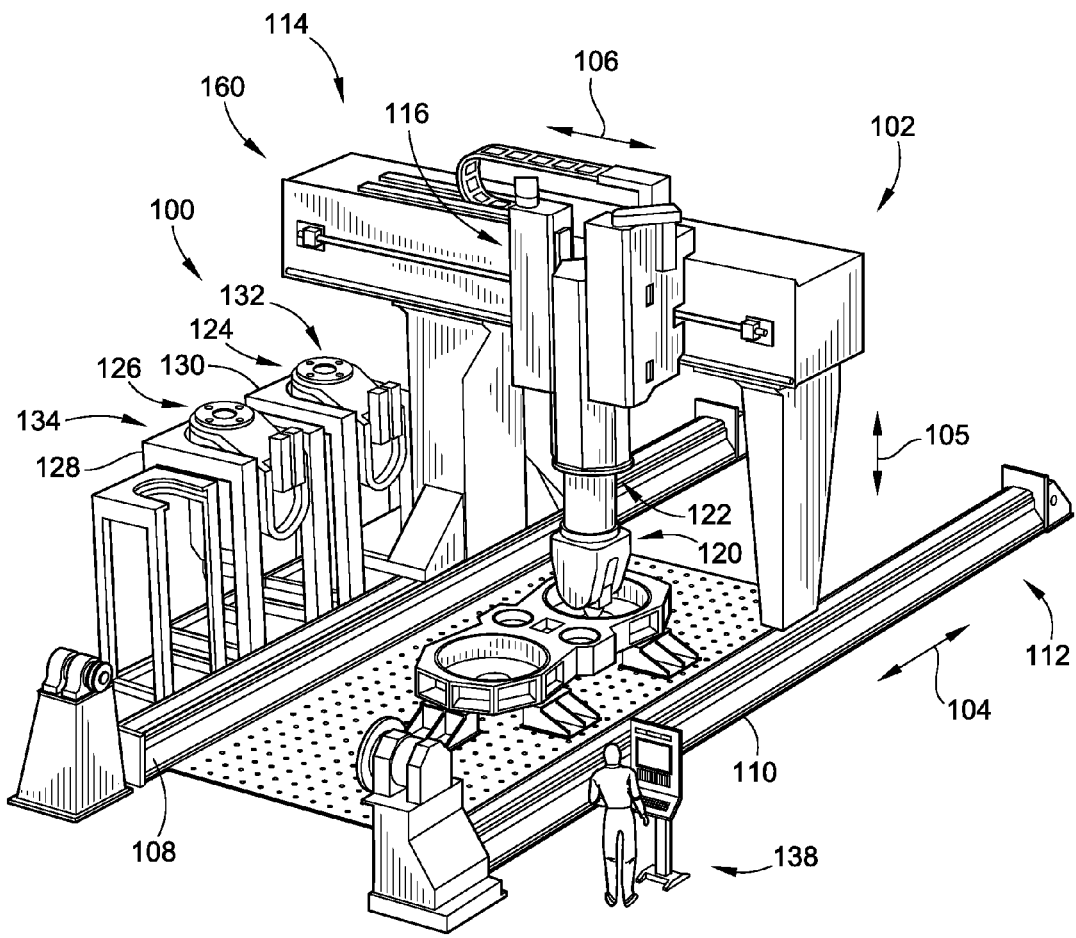
FIG. 1 is a perspective illustration of a modular manufacturing system according to an embodiment of the present invention having a plurality of manufacturing heads, with a multi-axial machine tool head attached to a positing system thereof.

FIG. 1 illustrates a modular manufacturing apparatus 100 (also referred to as a "modular manufacturing system") according to an embodiment of the present invention. The modular manufacturing apparatus 100 can be used for various manufacturing processes including cutting or milling operations, as well as composite fiber placement operations (including both fiber tape and fiber tow placement onto a stationary tool, mold or moveable mandrel). The modular manufacturing apparatus 100 is configurable to independently perform these various different manufacturing processes. However, a majority of the primary structures of the modular manufacturing apparatus 100 are reusable for the different manufacturing processes such that the capital investment for providing the devices to perform these various manufacturing processes is significantly reduced.

In FIG. 1, the modular manufacturing apparatus 100 generally includes a positioning system, illustrated in the form of gantry system 102, that provides three linear axes of motion illustrated as double-headed arrows 104-106. The linear axes of motion 104-106 are preferably perpendicular to one another. To provide motion along axis 104, the gantry system 102 generally includes a pair of radially spaced apart linear rails 108, 110 that form a base 112 that supports the rest of the structure of the gantry system 102. A horizontal gantry 114 is supported by the parallel linear rails 108, 110. The horizontal gantry 114 is mechanically driven along base 112 generally parallel to linear axis 104.

Attached to the horizontal gantry 114 is a vertical ram 116. The horizontal gantry 114 provides horizontal movement along linear axis 106. This allows the vertical ram 116 to be laterally positioned relative to linear rails 108, 110 parallel to linear axis 106. Further, the vertical ram 116 provides a linear vertical degree of freedom to the gantry system 102 parallel to the third linear axis 105.

Such a gantry system 102 is extremely expensive and providing such a gantry system for a single dedicated head can be wasteful and economically prohibitive to a manufacturing company. For instance, when it is desirable to machine a specific metal component, for example a mold, the other gantry systems relating to other processes such as fiber layup may sit idle. This could be particularly true if the mold is the mold upon which the fiber layup devices will operate.

Attached to the vertical ram 116, in FIG. 1, is a multi-axial machining head 120 for machining a piece of material (i.e. a blank of material). The machining head 120 may be considered an end-effecter in some embodiments. The machining head 120 may be a multi-axial material removal tool for removing material from a blank piece of material along various different axes.

The apparatus 100 includes a coupling 122 for mechanically securing the machining head 120 to the vertical ram 116. This coupling allows the machining head 120 to be easily automatically attached to and detached from the vertical ram 116.

Incorporated into the coupling 122 between the machining head 120 and the vertical ram 116 may be an electrical coupling that operably connects the machining head 120 to external electrical sources and control systems. This electrical coupling is not shown in FIG. 1. This electrical coupling could be internal to coupling 122 or may be an external independent coupling that does not form part of coupling 122 that mechanically secures the machining head 120 to the vertical ram 116.

The modular manufacturing apparatus 100 further includes additional manufacturing heads, namely a fiber tow layup head 124 as well as a fiber tape head 126. In the configuration illustrated in FIG. 1, the fiber tow head 124 and fiber tape head 126 are in a stored position. The fiber tow head 124 and fiber tape head 126 are mounted on separate racks 128, 130. These heads 124, 126 are waiting to be used by the modular manufacturing apparatus 100 in conjunction with a tool upon which the composite fiber tows or tape is laid-up. Each of the heads 120, 124, 126 include a portion of coupling 122 and a mating or cooperating portion is provided on the end of the ram 116.

In FIG. 1, coupling portions 132, 134 of the fiber tow head and fiber tape head 124, 126 are illustrated. These coupling portions 132, 134 in addition to the coupling portion of the multi-axial machining head 120, are substantially identical for mechanically coupling the individual heads 120, 124, 126 to the vertical ram 116. These additional heads 124, 126 have a same, a slightly different, or an entirely different electrical coupling for coupling the heads 124, 126 to the external control module 138.

However, due to the inclusion of a generally universal coupling for each of the various manufacturing heads 120, 124, 126, the individual heads can be easily fixably attached to the vertical ram 116 such that the modular manufacturing apparatus 100 can be configured to perform the desired manufacturing process, such as for example material milling or machining, fiber tow layup, or fiber tape layup. However, unlike prior systems that would require an individual positioning system for moving and otherwise controlling each of the heads, such as illustrated as gantry system 102, only a single gantry system 102 is required for performing the various different manufacturing processes. These different processes are performed at different times as only one head can be attached to the gantry system 102 at a given time.

Figure 2:
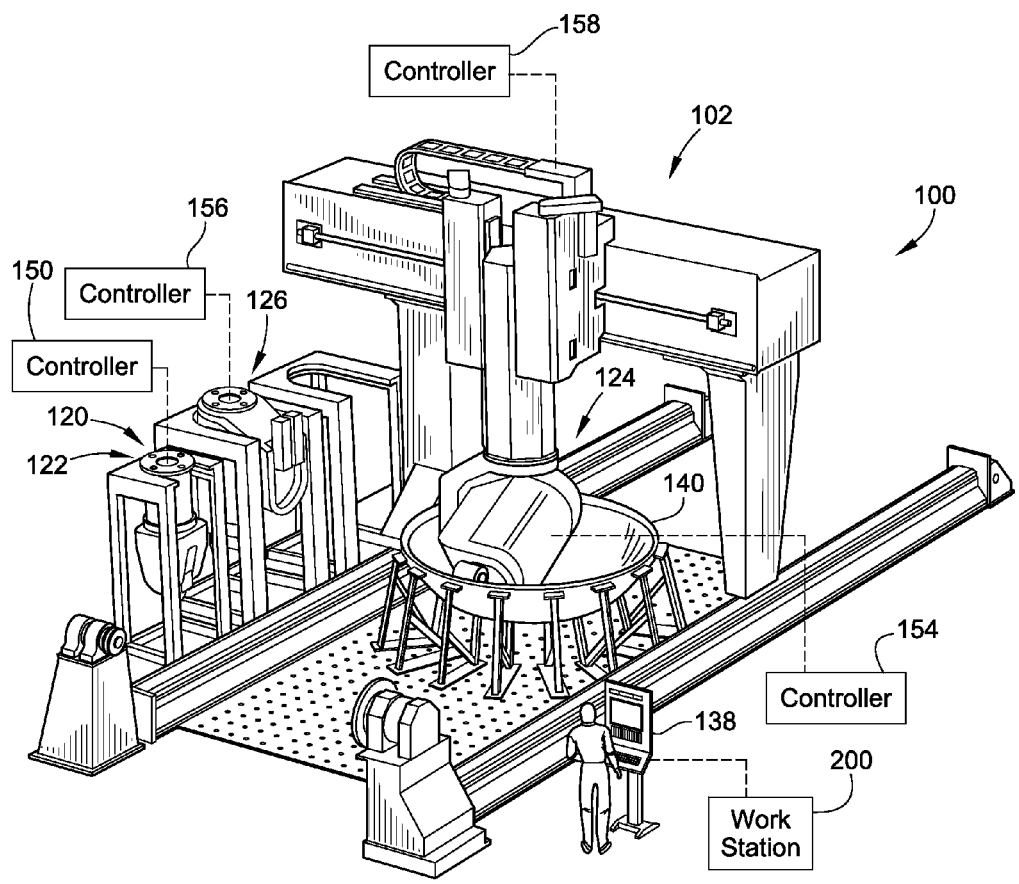
FIGS. 2-4 is an illustration of the system of FIG. 1 with a composite fiber tow placement apparatus, having a self contained creel assembly, attached to the positioning system thereof.
Figure 3:
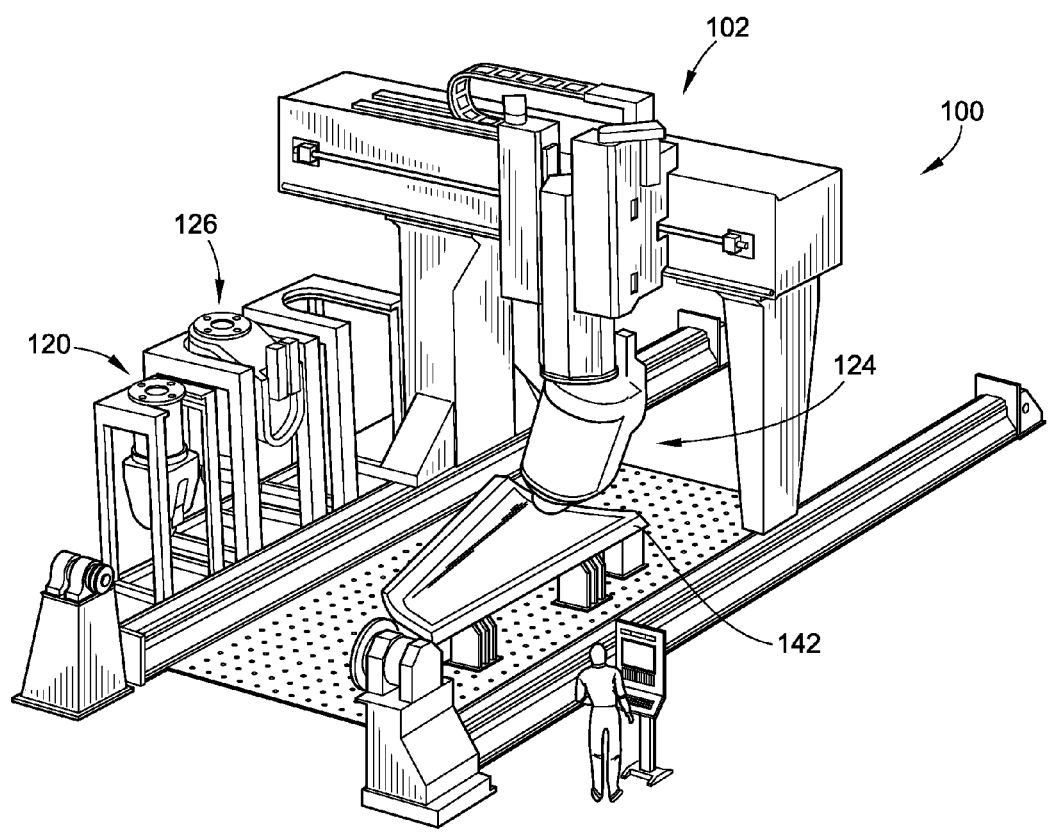
Figure 4:
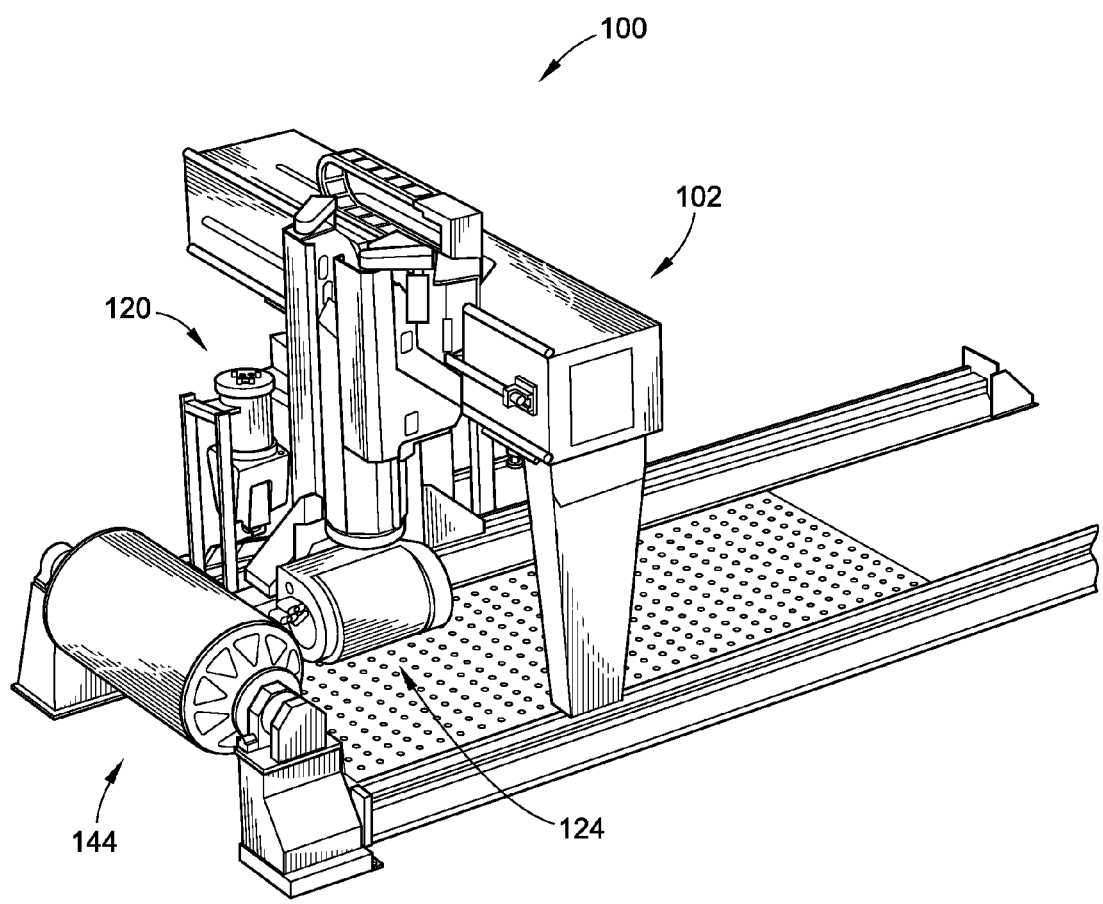
Figure 5:
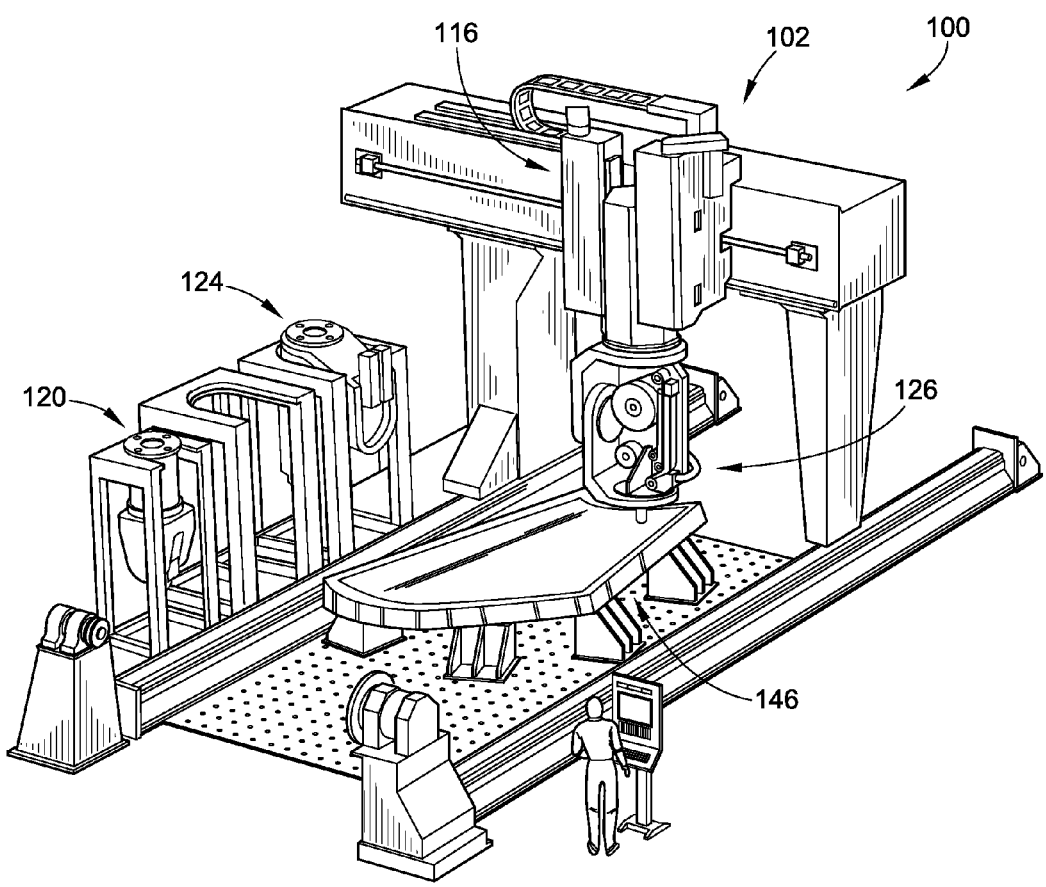
FIG. 5 is an illustration of the system of FIG. 1 with a composite fiber tape placement head attached to the positioning system thereof.

FIGS. 3-5 illustrate different configurations or orientations of the modular manufacturing apparatus 100 of the present invention. In FIG. 2, the modular manufacturing apparatus 100 is using the fiber tow head 124 to dispense fiber tows onto a female stationary mold 140 in this orientation the previous head, namely milling head 120 is mounted on a stationary rack adjacent to rack 128 housing the fiber tape head 126. FIG. 3 is similar to FIG. 2 in that the modular manufacturing apparatus 100 is using a fiber tow head 124 to layup fiber tows onto a stationary mold 142. FIG. 4 is the similar orientation or configuration as in FIGS. 2 and 3. However, in this embodiment, the fiber tow head 124 is applying fiber tows to a rotatable mandrel 144 as opposed to a fixed position mold or tool.

Figure 6:
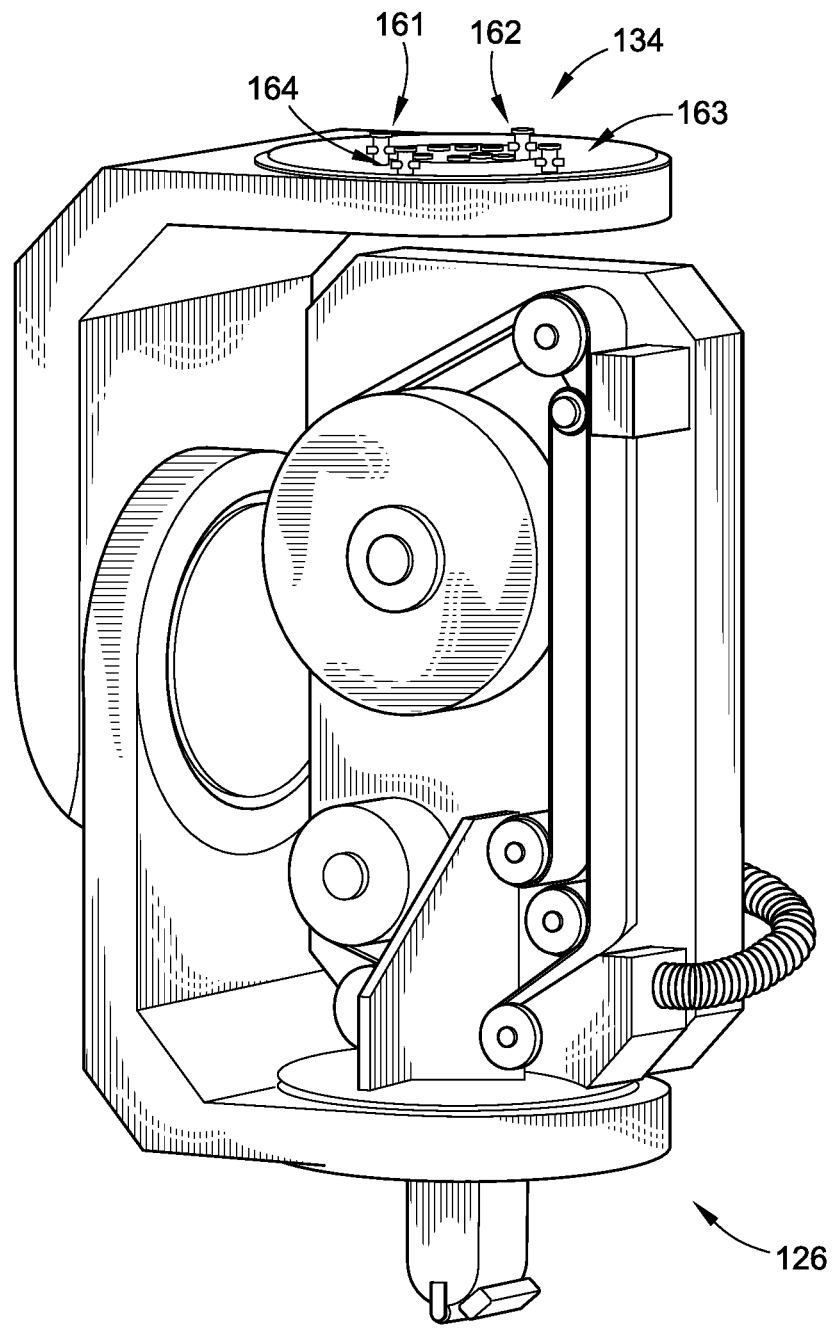
FIG. 6 is an illustration of the interchangeable composite tape placement head of FIG. 1 illustrating a portion of the coupling for fixably attaching the manufacturing head to the positioning system.

FIG. 5 is an alternative orientation or configuration of the modular manufacturing apparatus 100. In this configuration, the modular manufacturing apparatus 100 is configured with a fiber tape head 126 attached to vertical ram 116 for placement of fiber tape on mold 146. Again, the fiber tape head 126 is attached to vertical ram 116 using the standard coupling 134 (see FIG. 1). FIG. 6 is an enlarged illustration of the fiber tape head 126.

Returning to FIG. 1, the horizontal gantry 114 portion of the gantry system 102 has a horizontal portion 160 that extends laterally outward beyond rail 108 a sufficient distance such that the vertical ram 116 can be positioned laterally outward beyond rail 108 and aligned with the various racks and various heads 120, 124, 126 supported thereby. However, during operation, the racks and spare heads 120, 124, 126 are out of the way of the gantry system 102 such that the gantry system 102 has free movement along the various linear axes 104-106.

The coupling portions discussed previously are substantially mechanically all identical such that they can be coupled to the vertical ram 116. In FIG. 6, coupling 134 illustrates the inclusion of a plurality of vertically extending posts 161-164. These verticals posts 161-164 cooperate with corresponding structure of the vertical ram 116 to fixably secure the various heads 120, 124, 126 to the vertical ram 116.

The fiber placement heads including the fiber tow head 124 and fiber tape head 126 may be constructed according to U.S. patent application Ser. No. 12/696,476 entitled "Fiber Delivery Apparatus and System Having a Creel and Fiber Placement Head Sans Fiber Redirect," filed on Jan. 29, 2010, assigned to the assignee of the instant application. Therefore, the fiber placement heads 124, 126 may be self contained creel assemblies for housing either fiber tows or fiber tapes of the respective fiber placement heads 124, 126. Further, these heads may include various different degrees of freedom. Typically the degrees of freedom provided by the various heads are rotational degrees of freedom around axes that are generally perpendicular to one another.

Other manufacturing heads for performing additional manufacturing processes could be used with the modular manufacturing apparatus 100. For example, the modular manufacturing apparatus 100 can also include a coordinate measurement machine (CMM) head (not shown) for the inspection of various dimensions of a workpiece. As another example, a surface treatment head (not shown), e.g. painting head, can also be provided. As yet another example, an ultrasonic cutting head can also be provided. Indeed, it will be recognized that any number and type of heads can be employed to achieve the advantages discussed herein. As such, the apparatus 100 is not limited to particular types of manufacturing heads 120, 124, 126 discussed herein.

The modular manufacturing apparatus 100 can thus be seen to provide a significant cost reduction in the number of gantry system 102 required for the various different manufacturing processes. Further, only a single control module 138 would be required for the individual gantry 102. This control module 138 can then be used to control various different types of manufacturing processes. The control module would only need to be programmed with the particular software for controlling the different processes. This significantly reduces the cost and overhead for a manufacturer that wants to or needs to be able to provide these various different types of manufacturing processes in a given location. This also significantly reduces the overall footprint of the manufacturing apparatus significantly reducing the size of a needed building for housing the modular manufacturing apparatus 100.

Additionally, and with reference back to FIG. 2, each of the heads 120, 124, 126 may include a stand alone controller 150, 154, 156, respectively. Each of the controllers 150, 154, 156 are independent from one another and self contained within each head 120, 124, 126. Further, each controller 150, 154, 156 is operable to control various functions of its related head 120, 124, 126, as well as receive instructions in the form of numerical control code to facilitate such control.

Indeed, each head controller 150, 154, 156 implements control logic for position control, as well as head specific parameters such as speed, feed rate, tool offsets, etc. as governed by code supplied to the controller 150, 154, 156. Further, additional control parameters specific to each head 120, 124, 126 are also contemplated. For example, the tow layup head controller 154 may also implement logic relating to the operation of cutting tows, switching tow types, rewinding a tow, etc.

The coding for each head controller 150, 154, 156 can be generated using CAD/CAM software at a workstation 200, on or off-site. The coding is thereafter sent from the work station 200 to the control module 138, and thereafter to each of the head controllers 150, 154, 156 where appropriate. Alternatively, the coding for each head controller 150, 154, 156 can be generated manually at the control module 138 of the apparatus 100.

Still referring to FIG. 2, the ram 116 can also incorporate a stand alone, independent ram position controller 158. The ram position controller 158 is self contained within the ram 116. The ram controller 158 is operable to control various functions related to the ram 116 as well as receive instructions in the form of numerical control code to facilitate such control. The ram controller 158 is operable to govern the movement of the ram 116 along axis 105, as well as the gantry 114 along axes 102 and 104.

The ram position controller 158 implements control logic for position, speed, feed rate, tool offsets, etc. as governed by code supplied to the ram position controller 158. In certain embodiments, the ram controller 158 communicates with the head controllers 150, 154, 156 such that once the code is generated for the head controllers 150, 154, 156, each sends a corresponding set of commands to the ram position controller 158.

Figure 7:
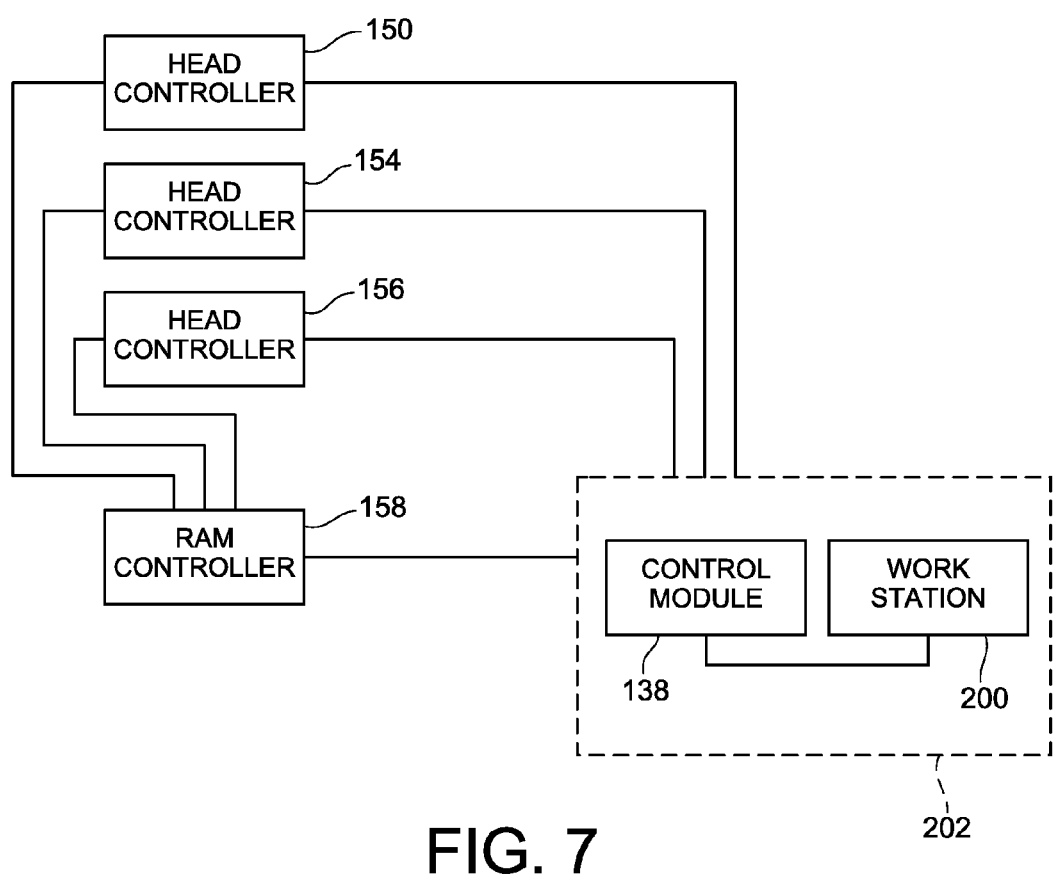
FIG. 7 is a schematic illustration of one embodiment of a control arrangement of the system of FIG. 1.

The above communication between the ram controller 158 and head controllers 150, 154, 156 is schematically illustrated in FIG. 7. Code is generated and sent from an interface 202 which can include the control module 138 and a work station 200. The code specific to each head 120, 124, 126 is received by the head controllers 150, 154, 156. Each head controller 150, 154, 156, is operable to generate and send position commands to the ram position controller 158 to effectuate the movement of the ram 116 and gantry 114 (see FIG. 1).

As one advantage, each head controller 150, 154, 156 can implement head specific tool offsets, feed rates, etc. within the position commands sent to the ram controller 158. For example, when a move command is sent to the head controller 150, the head controller 150 can implement head specific tool offsets prior to sending the resultant move command to the ram controller 158 to ultimately effectuate the movement of the head 120 relative to a workpiece. Such a configuration advantageously allows for the accurate control and operation of the ram 116 and gantry 114 despite using various machining heads having different operating characteristics and shape.

Still referring to FIG. 7, the ram position controller 158 can also receive commands directly from the interface 202. Additionally, the head controllers 150, 154, 156 and ram controller 158 also operably communicate with the interface 202 to provide a feedback loop to ensure accurate control of the apparatus 100.

Methods of switching between the various heads are provided that include switching from one head to another by setting one head on its corresponding rack and then connecting to the next desired head.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A manufacturing system comprising:
a gantry apparatus having functional elements enabling multiple movement pathways of the gantry apparatus comprising at least three linear axes by means of either two horizontal and one vertical axes of movement, or two vertical and one horizontal axes, and;
a moveable ram device positioned on one of the three axes of the gantry apparatus;
a plurality of manufacturing heads, each manufacturing head having a different characteristic, the plurality of manufacturing heads includes at least one fiber tow head configured to lay fiber tows and at least one fiber tape head configured to lay fiber tape, each manufacturing head having an internal controller, the internal controller of each manufacturing head having a dedicated computer numeric controlled software program designed for the particular manufacturing head;
an internal position controller for the gantry apparatus bearing a computer numeric control software oriented processor for determining the range, frequency and depth of movement of the moveable ram device, as directed by the internal controller of any one of the plurality of manufacturing heads attached to the moveable ram device; and
wherein the internal controller of each manufacturing head is capable of operating independently from the other internal controllers of the other manufacturing heads and is self contained within its corresponding manufacturing head.

2. The manufacturing system of claim 1, further comprising a control module programmed for controlling a process associated with the different characteristic of each of the plurality of manufacturing heads.

3. The manufacturing system of claim 2, wherein the plurality of manufacturing heads includes at least one milling head configured to machine a blank of material; the control module programmed to control a process of each of the plurality of manufacturing heads.

4. The manufacturing system of claim 1, wherein each manufacturing head has a first portion of a coupling arrangement for connecting the manufacturing head to a second portion of the coupling arrangement, the second portion of the coupling arrangement is provided by the moveable ram device, the first portions of the coupling arrangement provided by each of the manufacturing heads being substantially mechanically identical.

5. The manufacturing apparatus of claim 4, wherein the internal position controller for the gantry apparatus is separable with respect to the internal controller of each of the manufacturing heads.

6. The manufacturing apparatus of claim 5, further comprising a control module programmed for controlling a process associated with the different characteristics of each of the plurality of manufacturing heads, the control module communicating with the internal controller of any one of the plurality of manufacturing heads operably coupled to the moveable ram device, the control module communicating with the internal position controller.

7. The manufacturing system of claim 4, wherein the at least three linear axes includes a first axis, a second axis and a third axis, the gantry apparatus includes a pair of base rails for movement along the first axis, a horizontal gantry for movement along the second axis perpendicular to the first axis, the horizontal gantry further linearly moveable relative to the pair of base rails along the first axis, the moveable ram device providing movement along the third axis, the moveable ram device linearly moveable along the second axis, the horizontal gantry including a portion extending laterally outward beyond the pair of base rails in a direction extending parallel to the second axis, the moveable ram device movable along the portion of the horizontal gantry along the second axis outward beyond the pair of base rails; and at least one rack configured to hold at least one of the manufacturing heads, the at least one rack being positioned laterally outward beyond the pair of base rails and aligned with the portion of the horizontal gantry extending laterally outward beyond the pair of base rails such that the moveable ram device can selectively connect and disconnect from manufacturing heads stored on the at least one rack.

* * * * *